United States Patent
Itano (10) Patent No.: US 8,737,419 B2
(45) Date of Patent: May 27, 2014

(54) NETWORK CONCENTRATOR AND METHOD OF CONTROLLING THE SAME

(75) Inventor: Seiho Itano, Tokyo (JP)

(73) Assignee: Allied Telesis Holdings K.K., Tokyo (JP)

( * ) Notice: Subject to any disclaimer, the term of this patent is extended or adjusted under 35 U.S.C. 154(b) by 164 days.

(21) Appl. No.: 13/382,136

(22) PCT Filed: Jun. 25, 2010

(86) PCT No.: PCT/JP2010/060801
§ 371 (c)(1),
(2), (4) Date: Jan. 3, 2012

(87) PCT Pub. No.: WO2011/004718
PCT Pub. Date: Jan. 13, 2011

(65) Prior Publication Data
US 2012/0131188 A1    May 24, 2012

(30) Foreign Application Priority Data
Jul. 8, 2009   (JP) .................................. 2009-162162

(51) Int. Cl.
*H04J 3/17* (2006.01)
(52) U.S. Cl.
USPC ........... 370/434; 370/431; 370/437; 709/219; 709/224
(58) Field of Classification Search
USPC .......... 709/203, 217, 219, 224; 370/431, 433, 370/434, 437
See application file for complete search history.

(56) References Cited

U.S. PATENT DOCUMENTS

| | | | |
|---|---|---|---|
| 7,672,314 B2 * | 3/2010 | Elangovan | 370/395.53 |
| 2002/0016874 A1 | 2/2002 | Watanuki et al. | |
| 2005/0147082 A1 * | 7/2005 | Keddy et al. | 370/351 |
| 2006/0034181 A1 * | 2/2006 | Noguchi et al. | 370/242 |

FOREIGN PATENT DOCUMENTS

| | | |
|---|---|---|
| EP | 1708436 A2 * | 10/2006 |
| JP | 2000-253035 A | 9/2000 |
| JP | 2005-094162 A | 4/2005 |
| JP | 2006-054767 A | 2/2006 |
| JP | 2007-328671 A | 12/2007 |

OTHER PUBLICATIONS

International Search Report; PCT/JP2010/060801; Jun. 25, 2010.

(Continued)

*Primary Examiner* — Moustafa M Meky
*Assistant Examiner* — Uzma Alam
(74) *Attorney, Agent, or Firm* — Studebaker & Brackett PC (57) ABSTRACT

Provided is a method of controlling a network concentrator 100 which controls a link status between, of a plurality of ports 102, 104, 106, 108, at least one port 102, 104, 106 that belongs to a first group 10 and at least one port 108 that belongs to a second group 12 corresponding to the first group 10. The method comprises the steps of: detecting that each of the ports that respectively belong to the first group 10 and the second group 12 is link-up or link-down; and as a result of the detection step, if at least one port in one group of the first group 10 and the second group 12 is link-up and all the ports in the other group are link-down, setting the link-up port in the one group to disablement.

8 Claims, 5 Drawing Sheets

(56) References Cited

OTHER PUBLICATIONS

The International Preliminary Report on Patentability issued on Feb. 14, 2012: International Application No. PCT/JP2010/060801.

Translation of the Written Opinion of the International Searching Authority dated Jul. 20, 2010 International Application No. PCT/JP2010/060801.

\* cited by examiner

NETWORK CONCENTRATOR AND METHOD OF CONTROLLING THE SAME

TECHNICAL FIELD

The present invention relates to a network concentrator and a method of controlling the same. In particular, the present invention relates to a network concentrator capable of power saving with a simple configuration and a method of controlling the same.

BACKGROUND ART

In a conventional switching hub, when the status of either a first port or a second port changes from link-up to link-down, in spite of no communication between the first port and the second port, the other port is still link-up, thereby consuming wasted power. As a technique for solving the above problem, a technique is known which stops the operation of a clock control circuit so as not to generate a clock signal when no data received from a network device is present during a period of no communication due to, for example, a link-down, as disclosed in, for example, JP2007-328671 A. However, such a technique requires clock control for each port, and accordingly the configuration of and the processing flow in the switching hub device may become complex.

PRIOR ART REFERENCE

Patent Document

Patent Document 1: JP2007-328671 A

SUMMARY OF THE INVENTION

Problem to be Solved by the Invention

In view of the above, an object of the present invention is to provide a network concentrator capable of solving the above problem and a method of controlling the same. This object can be achieved by combining features recited in the independent claim. Further, the dependent claims specify further advantageous specific examples of the invention.

Means for Solving the Problem

According to one aspect of the invention, a method of controlling a link status of a plurality of ports of a network concentrator, a plurality of ports being configured to be connected to a network device on a network, and being at least one port that belongs to a first group and at least one port that belongs to a second group corresponding to the first group, the method comprising: detecting whether each of the ports that belong to the first group is in link-up or link-down and whether each of the ports that belong to the second group is in link-up or link-down; and as a result of the detection step, if at least one port in one group of the first group and the second group is in link-up and all the ports in the other group are in link-down, setting the at least one port in the one group to disablement.

According to the above aspect, whether each of the ports in the first group and the second group is in link-up or link-down is detected, and ports that are link-up, although they are not used for communication, are set to disablement. Thus, this can prevent ports from uselessly being in link-up. Therefore, power consumption for link-up can be reduced, and thus power saving of the network concentrator can be achieved.

Further, the port setting to disablement is performed based on the link status of each of the ports that respectively belong to the first group and the second group, and thus power saving with a simple configuration of the network concentrator can be achieved.

The above method may further include, before the detection step, the step of checking that the first group and the second group have been set.

In the above method, the setting step may include setting all the ports in the one group to disablement.

The above method may further include, after the setting step, if it is detected that a status of at least one port in the other group changes from link-down to link-up, the step of releasing the setting of disablement for the one group, which has been performed in the setting step.

According to one aspect of the invention, a network concentrator which controls a link status of a plurality of ports thereof, the plurality of ports being configured to be connected to a network device on a network, and being at least one port that belongs to a first group and at least one port that belongs to a second group corresponding to the first group, the network concentrator comprising: a detection section configured to detect whether each of the ports that belong to the first group is in link-up or link-down and each of the ports that belong to the second group is in link-up or link-down; and a setting section configured to, as a result of the detection by the detection section, if at least one port in one group of the first group and the second group is in link-up and all the ports in the other group are in link-down, set the link-up port in the one group to disablement.

According to the above aspect, whether each of the respective ports in the first group and the second group is in link-up or link-down is detected, and ports that are in link-up, although they are not used for communication, are set to disablement. Thus, this can prevent ports from uselessly being in link-up. Therefore, power consumption for link-up can be reduced, and thus power saving of the network concentrator can be achieved. Further, the port setting to disablement is performed based on the link status of each of the ports that respectively belong to the first group and the second group, and thus power saving with a simple configuration can be achieved.

The above apparatus may further include a group setting checking section that checks that the first group and the second group have been set.

In the above apparatus, the setting section may set all the ports in the one group to disablement.

In the above apparatus, if the detection section detects that a status of at least one port in the other group changes from link-down to link-up, the setting section may release the setting of disablement for the one group.

MODE FOR CARRYING OUT THE INVENTION

The present invention will be described below by way of embodiments of the invention with reference to the drawings. However, the embodiments below do not limit the invention according to the claims, and all the combinations of the features described in the embodiments are not necessarily essential for the solving means of the invention.

Figure 1:
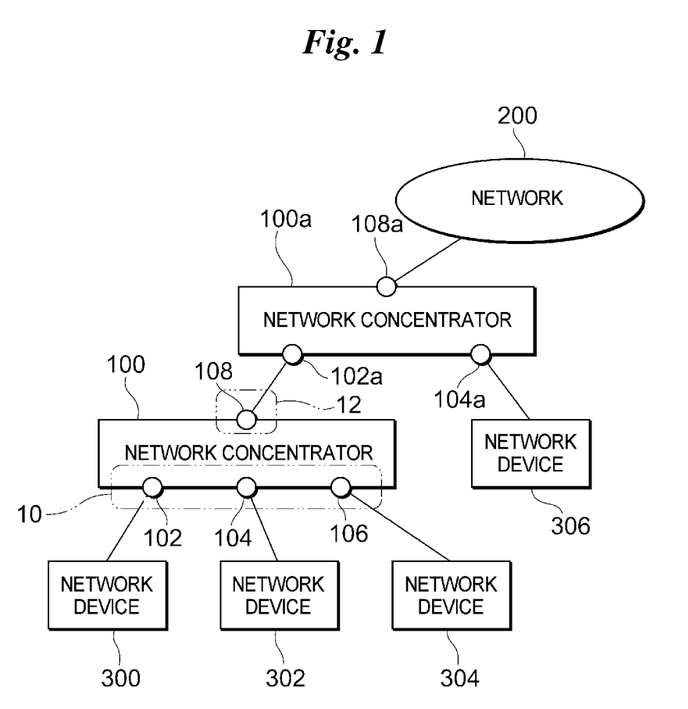
FIG. 1 is a diagram illustrating a network system including a network concentrator according to an embodiment of the invention.

FIG. 1 illustrates a network system including network concentrators according to an embodiment of the present invention. The network system includes network concentrators 100 and 100a for connecting a plurality of network devices on a network 200. The network concentrators 100 and 100a are typically switching hubs (also referred to as layer-2 switches).

The network concentrator 100 includes a plurality of ports 102, 104, 106 and 108 for being connected to the network devices on the network 200. The plurality of ports include the ports 102, 104 and 106 that belong to a first group 10 and the port 108 that belongs to a second group 12. The first and second groups 10 and 12 will be described in detail below.

In the example shown in FIG. 1, network devices 300, 302 and 304 are respectively connected to the lower ports 102, 104 and 106 of the network concentrator 100, and a lower port 102a of the other network concentrator 100a is connected to the upper port 108 of the network concentrator 100. Further, a network device 306 is connected to a lower port 104a of the network concentrator 100a, and the network 200 is connected to an upper port 108a of the network concentrator 100a.

General-purpose computers, network printers and switching hubs are given as examples of the network devices 300 to 306, and the configurations of the network devices 300 to 306 are not limited to the extent that they are devices that perform communication via a network.

Figure 2:
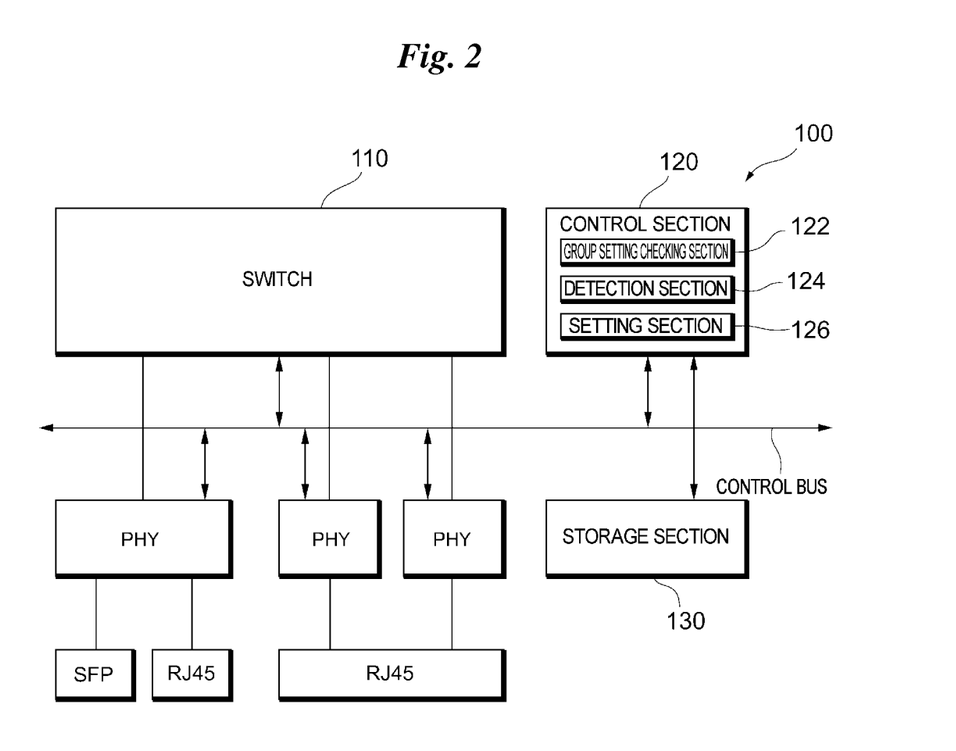
FIG. 2 is a diagram illustrating the configuration of the network concentrator according to an embodiment of the invention.

FIG. 2 illustrates the configuration of the network concentrator according to this embodiment. As shown in FIG. 2, the network concentrator 100 includes a switch circuit 110, PHY circuits and connectors (SFP and RJ45), and further includes a control section 120 that controls the link status of each port of the network concentrator 100, i.e., whether the port is in link-up or link-down. The switch circuit 110, the PHY circuits and the control section 120 are connected to a common control bus so as to transmit/receive data therebetween. Further, the network concentrator 100 includes a storage section 130 that stores a variety of information for controlling the control section 120. The storage section 130 is connected to the control section 120 so as to be capable of transmitting/receiving data to/from the control section 120. Note that the switch circuit 110 and the PHY circuits may be integrated into one chip.

In the network concentrator 100, for example, a CPU in the control section 120 executes a predetermined program (a program that specifies a method of controlling a network concentrator according to this embodiment) stored in a ROM, etc., in the storage section 130, thereby realizing the network concentrator 100 as various functional blocks described below or causing the network concentrator 100 to execute various steps. Note that the processing executed by the CPU based on the program, which specifies the method of controlling a network concentrator according to this embodiment, acting on a computer is the same as the function and operation of the corresponding member in the apparatus or method in this embodiment.

As shown in FIG. 2, the control section 120 includes: a group setting checking section 122; a detection section 124 that detects the link status of each port in the first group 10 and the link status of each port in the second group 12; and a setting section 126 that sets the link status of each of the ports based on a detection result from the detection section 124. The control section 120 is configured to read information stored in the storage section 130 shown in FIG. 2 or write information into the storage section 130.

The group setting checking section 122 checks that the first group 10 and the second group 12 have been set for the plurality of ports of the network concentrator 100. More specifically, if at least one port belonging to the first group 10 and at least one port belonging to the second group 12 have been set from among the plurality of ports of the network concentrator 100, the group setting checking section 122 makes a determination of "setting present," and if not, the group setting checking section 122 makes a determination of "no setting."

The first group 10 and the second group 12 are configured such that the ports in the respective groups can communicate with each other. Any ports of the network concentrator 100 can be set for each group. For example, as shown in FIG. 1, the lower ports 102, 104 and 106 of the network concentrator 100 may be set to serve as the first group 10, and the upper port 108 of the network concentrator 100 may be set to serve as the second group 12. Further, some (the ports 102, 104 and 106 in FIG. 1) of the ports of the network concentrator 100 may be set to serve as the first group 10, and all the remaining ports (the port 108 in FIG. 1) may be set to serve as the second group 12. Alternatively, some of the ports of the network concentrator 100 may be set to serve as the first group 10, and some of the remaining ports may be set to serve as the second group 12. The latter case indicates that ports that belong to neither the first group 10 nor the second group 12 exist. Further, the ports belonging to the first group 10 and the ports belonging to the second group 12 may be unchanged or dynamically changed in settings of groups. Moreover, one of the first group 10 and the second group 12 may include one port while the other group may include a plurality of ports (see FIG. 1). Alternatively, the first group 10 may include a plurality of ports while the second group 12 may include a plurality of ports.

The detection section 124 detects the link status of each of the ports 102, 104 and 106 that belong to the first group 10, and detects the link status of the port 108 that belongs to the second group 12. The communication status of each port can be detected from the switch circuit 100 and/or the PHY circuits via the control bus.

When at least one of the ports in the first group 10 is in link-up, and at least one of the ports in the second group 12 is in link-up, communication is established between the link-up ports. On the other hand, when all the ports of at least one of the first group 10 and the second group 12 are link-down (including the status of a failure such as disconnection of a cable), a connection cannot be established.

The setting section 126 is connected to the detection section 124 and is configured to acquire a result from the detection section 124. When at least one port of either the first group 10 or the second group 12 is in link-up, and all the ports in the other group are in link-down, the setting section 126 sets the link-up port in the relevant group to disablement (including the status of being unable to be linked). More specifically, the setting section 126 sends a command to the switch circuit 110 and/or the PHY circuits so as to set the link-up port to disablement. Further, the disablement may be attained by turning off the PHY circuits and the switch 110, or by turning off or resetting the PHY circuits (which includes, when the PHY circuit includes a plurality of control blocks corresponding to the ports, turning off or resetting at least one control block). Alternatively, the disablement may be attained by outputting a signal that causes the switch 110 to interrupt being link-up or outputting such a signal to the PHY circuits. Further, all the ports in the group to which the link-up port belongs may be set to disablement.

The setting section 126 further includes a function of releasing the port setting of disablement based on a detection result from the detection section 124. For example, when the setting section 126 sets the ports 102, 104 and 106 in the first group 10 to disablement, if the detection section 124 detects that the port 108 in the second group 12 is link-up, the setting section 126 acquires the detection result, and releases the setting of disablement for each of the ports 102, 104 and 106.

As described above, according to the network concentrator of this embodiment, whether each of the respective ports in the first group and the second group is in link-up or link-down is detected, and ports that are in link-up, although they are not used for communication, are set to disablement. Thus, this can prevent ports from uselessly being link-up. Therefore, power consumption for link-up can be reduced, and thus power saving of the network concentrator can be achieved. Further, the port setting to disablement is performed based on the link status of each of the ports that respectively belong to the first group and the second group, and thus power saving with a simple configuration of the network concentrator can be achieved.

Figure 3:
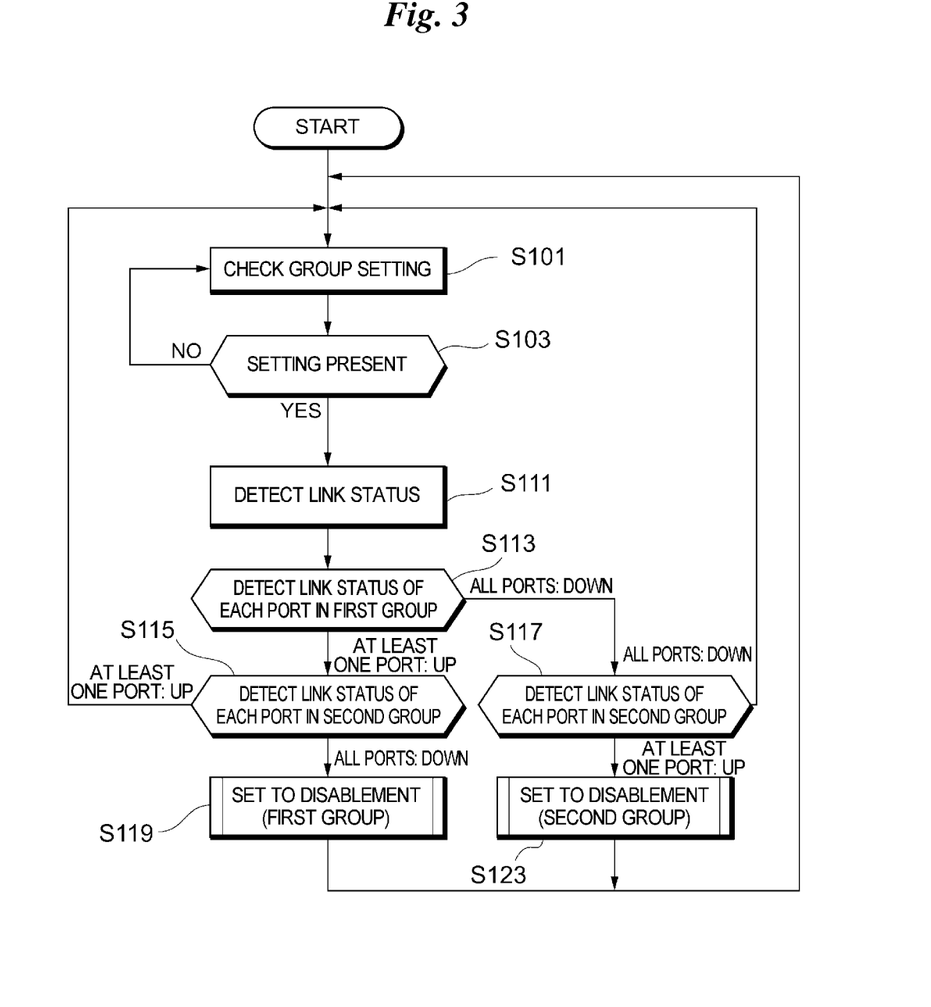
FIG. 3 is a flowchart of a method of controlling the network concentrator according to an embodiment of the invention.
Figure 4:
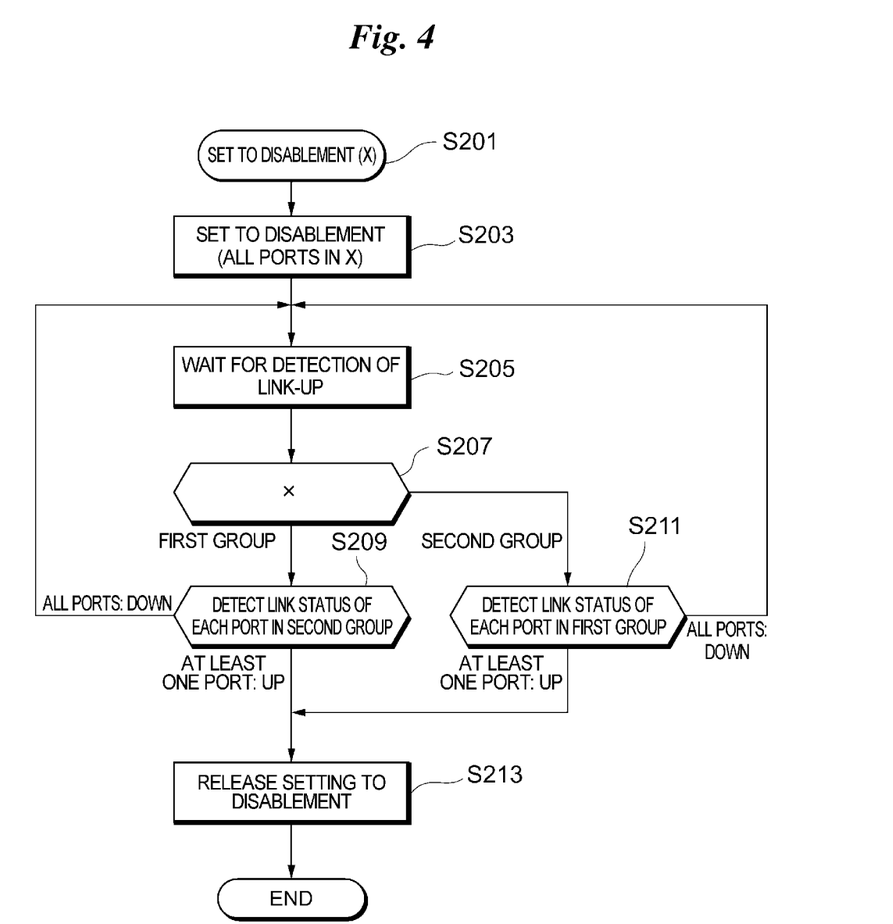
FIG. 4 is a flowchart of the method of controlling the network concentrator according to an embodiment of the invention.

Next, a method of controlling a network concentrator according to one embodiment of the present invention will be described with reference to FIGS. 3 and 4. FIG. 3 shows a flowchart of the steps of the entire method of controlling a network concentrator, and FIG. 4 shows a flowchart of the sub steps, S119 and S123 in FIG. 3. Note that the order of the steps described below (including not only steps denoted by symbols but also the partial steps of the steps denoted by the symbols) may arbitrarily be changed, or the steps may be executed in parallel, without causing any inconsistency in the content of the processing.

First, in the network system, it is checked that the first group 10 and the second group 12 have been set for the plurality of ports of the network concentrator, to which the program specifying the method of controlling a network concentrator according to this embodiment has been applied (S101). Checking the setting of the first group 10 and the second group 12 can be carried out by the group setting checking section 122. If the group setting checking results in a determination of "setting present," the processing proceeds to the next step, whereas if the group setting results in a determination of "no setting," the processing returns to step S101 (S103).

Next, in the network concentrator 100, the link status of each of the ports belonging to the first group 10 and each of the ports belonging to the second group 12 is detected (S111). That is, whether a port is in link-up or link-down is detected regarding all the ports belonging to the first group 10 and all the ports belonging to the second group 12. Such link status detection can be performed by the detection section 124.

The link status of each port in the first group 10 is then detected (S113). If the result indicates that at least one port is link-up (UP), the processing proceeds to step S115, whereas if all the ports are link-down (DOWN), the processing proceeds to step S117.

If the result of the detection of the link status of the port 108 in the second group 12 in step S115 indicates that at least one port in the second group 12 is in link-up (UP), the processing returns to the group setting checking step (S101). That is, normal communication is established between the link-up port(s) in the first group and the link-up port(s) in the second group 12, and thus the setting to disablement is not required.

On the other hand, if the result of the detection of the link status of each port in the second group 12 in step S115 indicates that all the ports in the second group 12 are link-down (DOWN), the link-up port(s) in the first group 10 is set to disablement (S119). That is, there are ports in the first group 10 which are link-up although they are not used for communication, and thus the ports are set to disablement Note that such setting to disablement can be performed by the setting section 126.

Further, if the result of the detection of the link status of each port in the second group 12 in step S117 indicates that at least one port in the second group 12 is in link-up (UP), the link-up port(s) in the second group 12 is set to disablement (S123). That is, there are ports in the second group 12 which are in link-up although they are not used for communication, and thus the ports are set to disablement. Note that such setting to disablement can be performed by the setting section 126.

On the other hand, if the result of the detection of the link status of each port in the second group 12 in step S117 indicates that all the ports in the second group 12 are in link-down (DOWN), the processing returns to the group setting checking step (S101). That is, since all the ports in the first group 10 and the second group 12 are in link-down, the setting to disablement is not required.

Next, the steps of setting ports to disablement (S119 and S123) will be described more specifically with reference to FIG. 4.

First, regarding a group (X) having a link-up port(s), the setting section 126 sets the link-up port(s) to disablement (S201). Here, all the ports of the group (X) having a link-up port(s) may be set to disablement (S203).

The setting section 126 then detects the link status of each of the ports in the group, of the first group 10 and the second group 12, which is not the group for which the setting to disablement has been made, and waits for a link-up to be detected in the ports (S205).

Specifically, if the setting section 126 sets the port(s) in the first group 10 to disablement (S207), the setting section 126 detects the link status of each port in the corresponding second group 12 (S209). If the result shows that all the ports in the second group 12 are in link-down (DOWN), the setting section 126 subsequently waits for a link-up to be detected in the second group 12. On the other hand, if at least one port in the second group 12 is link-up (UP), the setting section 126 releases the setting to disablement for the port(s) in the first group 10 (S213).

Further, if the setting section 126 sets the port(s) in the second group 12 to disablement (S207), the setting section 126 detects the link status of each port in the corresponding first group 10 (S211). If the result shows that all the ports in the first group 10 are in link-down (DOWN), the setting section 126 subsequently waits for a link-up to be detected in the first group 10. On the other hand, if at least one port in the first group 10 is in link-up (UP), the setting section 126 releases the setting to disablement for the port(s) in the second group 12 (S213).

As described above, according to the method of controlling a network concentrator of this embodiment, whether each of the respective ports in the first group and the second group is in link-up or link-down is detected, and ports that are in link-up, although they are not used for communication, are set to disablement. Thus, this can prevent ports from uselessly being link-up. Therefore, power consumption for link-up can be reduced, and thus power saving of the network concentrator can be achieved. Further, the port setting to disablement is performed based on the link status of each of the ports that respectively belong to the first group and the second group, and thus power saving with a simple configuration of the network concentrator can be achieved.

Further, in a case of the port setting to disablement, all the ports in the relevant group are set to disablement, whereby the power consumption of the entire group is reduced. This attains further power saving of the network concentrator.

Furthermore, the release of setting to disablement is performed by detecting the link status of each port in the group not being the group for which the setting to disablement has been made. Therefore, while power saving is attained, recovery of the operation is made with a simple configuration.

Figure 5:
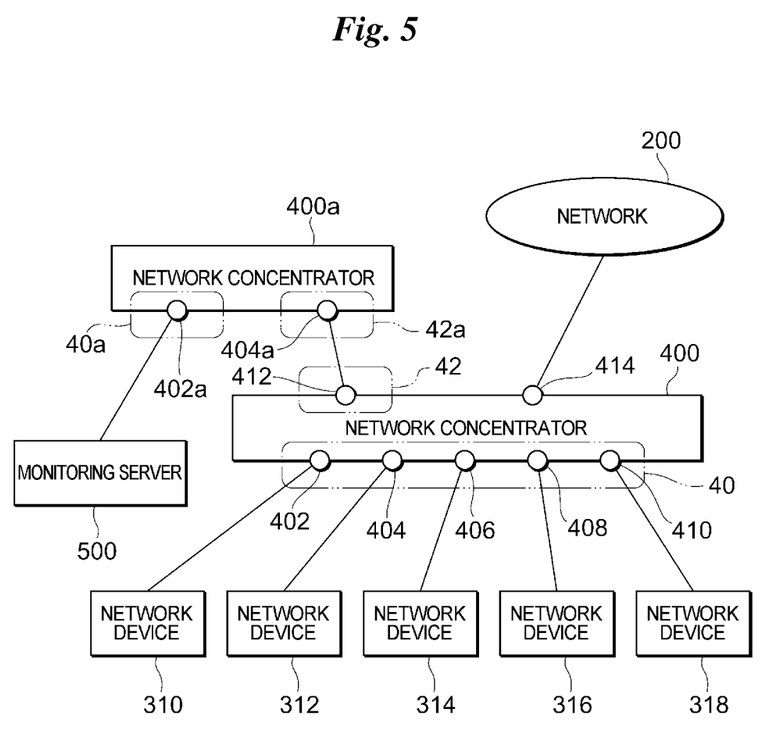
FIG. 5 is a diagram illustrating another application example of the network concentrator according to an embodiment of the invention.

Next, another application example of the network concentrator according to an embodiment of the present invention will be described with reference to FIG. 5. This network system includes a network concentrator 400 provided with a plurality of ports 402, 404, 406, 408, 410, 412 and 414 and a network concentrator 400a provided with a plurality of ports 402a and 404a.

The network concentrator 400 is set such that the ports 402, 404, 406, 408 and 410 belong to a first group 40 and that the port 412 belongs to a second group 42. Further, network devices 310, 312, 314, 316 and 318 are respectively connected to the ports 402, 404, 406, 408 and 410, the port 404a of the network concentrator 400a is connected to the port 412, and the network 200 is connected to the port 414. The network concentrator 400a is set such that the port 402a belongs to a first group 40a and that the port 404a belongs to a second group 42a. Further, a monitoring server 500 is connected to the port 402a, and the port 412 of the network concentrator 400 is connected to the port 404a. The configurations of the network concentrator 100 can be applied to the other configurations of the network concentrators 400 and 400a.

The network concentrators 400 and 400a of this embodiment have a characteristic that, when the plurality of devices 310, 312, 314, 316 and 318 communicate in the network 200 with monitoring of the monitoring server 500, security of the system is improved in addition to the power saving of the system which is attained as described above.

That is, even if the port 402a becomes link-down due to, for example, disconnection of a cable, so that the monitoring server 500 becomes unable to monitor the network devices, malicious access to the network devices on the network 200 can be prevented by setting the ports 402, 404, 406, 408 and 410, which are connected to the network devices 310, 312, 314, 316 and 318, to disablement.

More specifically, in the network concentrator 400a, when the port 402a in the first group 40a becomes link-down, the status of the port 404a in the second group 42a is set from link-up to disablement. It is then detected in the network concentrator 400 that the port 404a has been set to disablement, and based on such detection, the status of the port 412 in the second group 42 changes from link-up to link-down. Thus, in the network concentrator 400, the link-up ports 402, 404, 406, 408 and 410 in the first group 40 are set to disablement, and as a result, the network devices can be prevented from accessing the network 200 without monitoring of the monitoring server 500.

On the other hand, when all the ports 402, 404, 406, 408 and 410, which are connected to the network devices 310, 312, 314, 316 and 318, become link-down, the port 402a connected to the monitoring server 500 is set to disablement, and power saving of the system is attained when no monitoring is required.

As described above, the network concentrator and the method of controlling the same according to the embodiments can attain power saving of the system, and further can improve the system security.

Further, the above embodiment has described the case in which: the link-down ports in the first group are detected, and the ports in the second group are then set to disablement; and the link-down ports in the second group are detected, and the ports in the first group are then set to disablement. However, the setting is not limited to such two-way setting to disablement, and as a modification, one-way setting to disablement may be performed.

Further, the above embodiment has described the case in which a pair of a first group and a second group is set in a network concentrator. However, the number of pairs is not limited thereto. A plurality of pairs of first groups and second groups may be set in the network concentrator. In such a case, a part of a group of a pair may be set to overlap a group of another pair.

The examples and application examples described through the embodiments of the present invention can be used by appropriately being combined or after additionally being provided with changes and/or improvements according to purposes, and the present invention is not limited to the descriptions in the above embodiments. It is clear from the scope of claims that modes of such combinations or modes including such additional changes and/or improvements can be comprised in the technical scope of the present invention.

DESCRIPTION OF REFERENCE NUMERALS 10, 40, 40a . . . First group
12, 42, 42a . . . Second group
100, 100a, 400, 400a . . . Network concentrator
102, 102a, 104, 104a, 106, 108, 108a . . . Port
200 . . . Network
300, 302, 304, 306 . . . Network device
120 . . . Control section
122 . . . Group setting checking section
124 . . . Detection section
126 . . . Setting section

What is claimed is:

1. A method of controlling a link status of a plurality of ports of a network concentrator, the plurality of ports being configured to be connected to a network device on a network, the plurality of ports at least one port in a first group and at least one port in a second group, and the second group corresponding to the first group, the method comprising:
   detecting whether each of the ports in the first group is in link-up or link-down and whether each of the ports in the second group is link-up or link-down;
   as a result of the detection step, if at least one port in of the first group and the second group is in link-up and all the ports in the second group are in link-down, setting a PHY circuit corresponding to the at least one port in the first group to disablement; and
   releasing the disablement of the PHY circuit if at least one port in the second group is changed from link-down to link-up.

2. The method of controlling a network concentrator according to claim 1, further comprising, before the detection, checking that the first group and the second group have been set.

3. The method of controlling a network concentrator according to claim 1, wherein the setting including setting the PHY circuit corresponding to all the ports in the one group to disablement.

4. A network concentrator which controls a link status of a plurality of ports thereof, the plurality of ports being configured to be connected to a network device on a network, and the plurality of ports having at least one port in a first group and at least one port in a second group, and the second group corresponding to the first group, the network concentrator comprising:

a detection section configured to detect whether each of the ports in the first group is in link-up or link-down and each of the ports in the second group is link-up or link-down; and a setting section configured to, as a result of the detection by the detection section, if at least one port in of the first group is in link-up and all the ports in the second group are link-down, set a PHY circuit corresponding to the at least one port in first group to disablement, wherein the setting section is configured to release the disablement of the PHY circuit if at least one port in the second group is changed from link-down to link-up.

5. The network concentrator according to claim 4, further comprising a group setting checking section that checks that the first group and the second group have been set.

6. The network concentrator according to claim 4, wherein the setting section sets the PHY circuit corresponding to all the ports in the first group to disablement.

7. The method of controlling a network concentrator according to claim 2, wherein the setting including setting the PHY circuit corresponding to all the ports in the first group to disablement.

8. The network concentrator according to claim 5, wherein the setting section sets the PHY circuit corresponding to all the ports in the first group to disablement.

\* \* \* \* \*